April 19, 1949.    D. WOYTAL ET AL    2,467,922
PIPE COUPLING
Filed Feb. 18, 1946
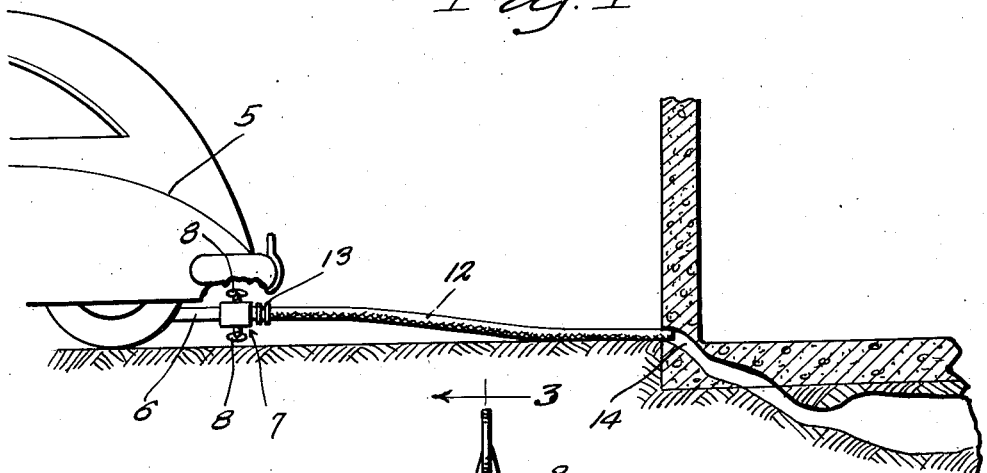
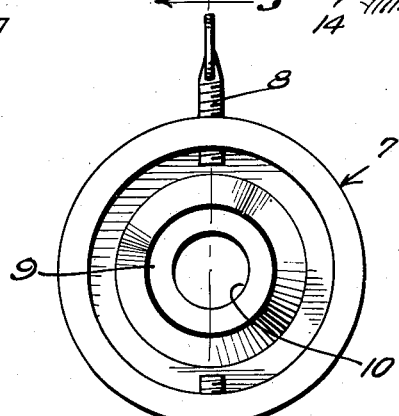
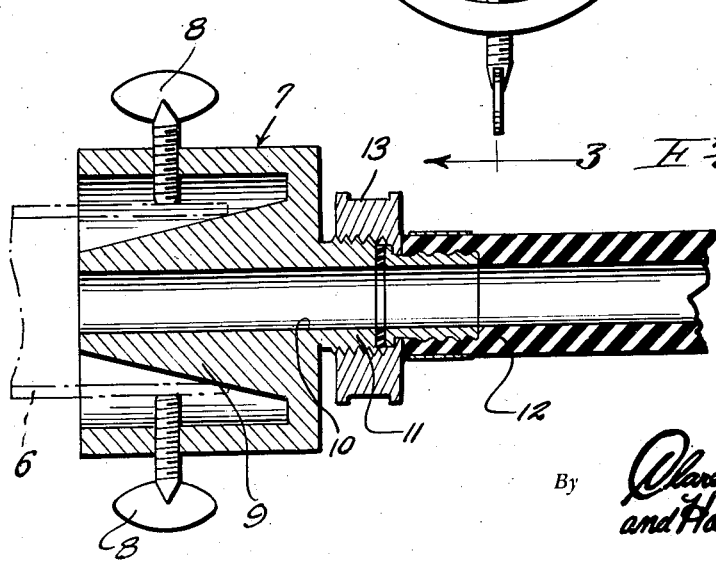
Inventor
DANIEL WOYTAL
MAX J. BUSCH
FRANK A. WOYTAL
By *Clarence A. O'Brien
and Harvey B. Jackson*
Attorneys Patented Apr. 19, 1949

2,467,922

UNITED STATES PATENT OFFICE 2,467,922

PIPE COUPLING

Daniel Woytal, Max J. Busch, and Frank A. Woytal, Milwaukee, Wis.

Application February 18, 1946, Serial No. 648,320

1 Claim. (Cl. 285—2)

1

The present invention relates to new and useful improvements in devices for exterminating rats and other rodents, and more particularly to a device of this character embodying means for attaching a hose to the exhaust pipe of an automobile or other motor driven vehicle, whereby to feed the poison of the exhaust gasses from the engine of the vehicle into a rat hole for killing any animal therein.

An important object of the present invention is to provide a novel coupling for connecting the hose to the discharge end of an engine exhaust pipe.

A further object of the present invention is to provide a device of this character of simple and practical construction, which is efficient and reliable in use, relatively inexpensive to manufacture, which may be connected to various sizes of engine exhaust pipes and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view.

Figure 2 is an enlarged front elevational view of the hose coupling and

Figure 3 is a sectional view taken on a line 3—3 of Figure 2.

Referring now to the drawing in detail wherein for the purpose of illustration we have disclosed a preferred embodiment of the invention, the numeral 5 designates an automobile of conventional construction and which includes an engine exhaust pipe 6 at the rear end thereof.

A coupling member is shown generally at 7 and is of substantially cup-shaped construction adapted to telescope over the end of the exhaust pipe 6 for securing thereto by one or more set-screws 8 threaded through the walls of the coupling.

The bottom of the coupling member on its inside is formed with a tapering plug 9 adapted to enter the end of the exhaust pipe 6 in tight fitting engagement therein. The plug 9 and bottom of the coupling member 7 is formed with a bore 10 extending through an externally threaded nipple 11 projecting outwardly from the bottom of the coupling member.

One end of a hose 12 is connected to the nipple 11 by a nut 13 threaded thereon, the nipple 11

2 being of standard size to receive the nut of a standard hose coupling

The cup-shaped coupling member 7 is constructed of a size to receive exhaust pipes of various diameter and the tapering plug 9 is likewise adapted for tight fitting engagement within the exhaust pipes of various sizes.

In the operation of the device, the engine of the motor vehicle 5 is started and the free end of the hose 12 is inserted in the entrance 14 of a rat hole or other opening in the ground frequented by rodents or other animals. The exhaust gasses entering the hole will kill the animal occupying the same.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

We claim:

A hose coupling comprising a cup-like cylindrical coupling member having an outer wall spaced from and integral with a hollow tapering axial plug within said coupling member, said plug being frictionally received in the end of a pipe, a set-screw threaded through said outer wall and engaging said pipe for securing the coupling member thereto, and a threaded reduced nipple projecting from the outer end of the coupling member having a central bore in communication with the plug and adapted for attaching a threaded hose coupling thereto.

DANIEL WOYTAL.
MAX J. BUSCH.
FRANK A. WOYTAL.

REFERENCES CITED

The following references are of record in the file of this patent:

UNITED STATES PATENTS

| Number | Name | Date |
|---|---|---|
| 431,596 | Curlett | June 25, 1895 |
| 1,994,784 | Porzel | Mar. 19, 1935 |
| 2,248,576 | McConnohie | July 8, 1941 |